United States Patent [19]

Cobbs, Jr. et al.

[11] Patent Number: 4,505,957
[45] Date of Patent: Mar. 19, 1985

[54] COATING BY ATOMIZATION OF HIGH (I.E., ABOUT 70–99% BY WEIGHT) SOLIDS FILM-FORMING COMPOSITIONS

[75] Inventors: Walter H. Cobbs, Jr., Amherst; William R. Rehman, Vermilion, both of Ohio

[73] Assignee: Nordson Corporation, Amherst, Ohio

[21] Appl. No.: 449,379

[22] Filed: Dec. 13, 1982

Related U.S. Application Data

[63] Continuation-in-part of Ser. No. 58,837, Jul. 19, 1979.

[51] Int. Cl.³ .............................................. B05D 1/02
[52] U.S. Cl. ................................. 427/422; 427/385.5; 427/386
[58] Field of Search ............... 427/422, 421, 373, 386, 427/385.5; 222/146 HE; 239/124, 135; 118/302

[56] References Cited

U.S. PATENT DOCUMENTS

| | | |
|---|---|---|
| 2,150,096 | 7/1939 | Bogin . |
| 2,517,049 | 8/1950 | Stevens . |
| 2,590,442 | 3/1952 | Miller et al. . |
| 2,754,228 | 7/1956 | Bede . |
| 2,763,575 | 9/1956 | Bede . |
| 2,980,339 | 4/1961 | Bok et al. . |
| 3,286,992 | 11/1966 | Armeniades et al. . |
| 3,664,638 | 5/1972 | Grout et al. . |
| 3,704,006 | 11/1972 | Grout et al. . |
| 3,800,985 | 4/1974 | Grout et al. . |
| 3,820,718 | 6/1974 | Ammon . |
| 4,045,185 | 8/1977 | Azemar et al. . |
| 4,059,466 | 11/1977 | Scholl et al. . |
| 4,059,714 | 11/1977 | Scholl et al. . |
| 4,156,754 | 5/1979 | Cobbs et al. . |
| 4,247,581 | 1/1981 | Cobbs et al. . |

OTHER PUBLICATIONS

Bede, "Airless Atomization", pp. 1-3, Jun. 1952.

*Primary Examiner*—Sadie L. Childs
*Attorney, Agent, or Firm*—Wood, Herron & Evans

[57] ABSTRACT

High solids coating methods and apparatus are disclosed which eliminate many of the disadvantages associated with known coating processes. The techniques disclosed require only a minor amount of a volatile solvent to achieve atomization and application of a paint or other coating material. High solids coating compositions containing about 70–99% by weight solids are atomized and coated. This method also enables polymeric compositions having high molecular weight to be employed as coating materials. According to techniques described, liquid compositions containing film-forming solids are kept under pressure with a minor amount of a highly volatile solvent of from about 1 to 30% by weight, even as low as about 1–10% by weight, at a temperature above the normal boiling point of the solvent. Such a composition is then atomized by releasing the pressure upon a stream of the composition at a temperature above the normal boiling point of the solvent and below the minimum foam temperature at atmospheric pressure for the composition. The film-forming solids are thus conveyed with or without an external atomizing means.

23 Claims, 3 Drawing Figures

COATING BY ATOMIZATION OF HIGH (I.E., ABOUT 70–99% BY WEIGHT) SOLIDS FILM-FORMING COMPOSITIONS

RELATED APPLICATION

This application is a continuation-in-part of application Ser. No. 58,837, filed Jul. 19, 1979, of Walter H. Cobbs, Jr. et al.

BACKGROUND OF THE INVENTION

The coating and finishing industry has focused with great intensity upon its operations and resulting adverse effects upon man's environment. Present coating techniques tend to create odors, smog, health and safety hazards. Legislation toward reducing such hazards at all levels of coatings manufacture and use is well advanced and enforced. However, compliance is not resulting in substantial changes in types of coatings used, rather, coatings are almost exclusively based on the solvent systems. Perhaps the most serious concern of the industry today, from a standpoint of both raw materials and environmental control, is the solvent components of the paint. Related concerns are the high price of energy, labor costs and capital in converting paints and liquid coatings into useful films.

The problems of the industry are illustrated by the commonly employed processes of liquid spray-coating, electrostatic liquid spray-coating and electrostatic powder-coating. In the spray-coating application of a resinous material, it is usual to dissolve the resinous material in an organic solvent to provide a suitable viscosity for spraying. Such methods of spraying solvent mixtures of film-forming resinous materials require significant amounts of solvent and lose solvent in handling, coating and finishing useful articles. Electrostatic liquid spray-coating techniques have been employed for coating normally liquid materials, i.e., paints or solvent coatings which have been atomized by air, airless or centrifugal atomization techniques. With respect to each of the spray-coating techniques, it is therefore common practice to dissolve a film-forming solid in an organic solvent to allow the composition to be handled, atomized and deposited upon the article to be finished. In an attempt to overcome the pollution problems associated with solvent spray-coating techniques, sophisticated recovery and after burner systems are employed to trap or burn solvent effluents. The cost of installation and operation of such systems and incinerators to dispose of the waste solvent is a very sizable expense. While the more recent electrostatic powder-coating technique employs no solvent, such a technique involves the use of costly coating material and expensive handling equipment. Further technical material problems remain because it is difficult to provide satisfactory dry powders which have long shelf-lives for handling and spraying.

An important part of this brief overview of background for this invention is the sophistication in coating materials that has occurred. The search for a high quality polymeric coating material which can be applied without air pollution has been extensive. However, for instance in the spray application of molten polymers or concentrated polymeric solutions, techniques have not advanced to any significant extent because of the formulators' lack of understanding of atomizing mechanisms and by a similar lack of understanding by spray equipment designers as to the nature of high polymeric liquids. There have been many studies undertaken which relate to theoretical energies required, and the relationship of viscosity, surface tension, temperature etc., of the liquid coatings. However, for use with high polymers and their concentrated solutions, the viscosity measurements are relatively meaningless and often misleading as comparative indicators of the relative ease or difficulty in atomizing two different polymeric liquids. At each stage of the process for atomizing and conveying a polymeric liquid to a surface, the liquid resists high speed deformation. Therefore, it may be understood why solvent additions have been employed because they have the effect of separating the polymeric molecules and facilitating their relative movement to make the solution easier to deform at high speeds and thus easier to atomize. However, even after considerable effort over many years has been expended to prepare high solids coating compositions containing above 70% by weight of polymeric and pigmentary solids, still little success has been achieved. Examples of disclosure in the patent art for methods of spray-coating with solvents include U.S. Pat. Nos. 2,150,096 and 2,754,228. In U.S. Pat. No. 2,754,228, for instance, the method depends upon solvent spraying under heat and pressure where the temperature is lower than the boiling point at atmospheric pressure of at least 50% of the solvent to obtain volatilization of no more than 50% on passing through a spray orifice. Compositions containing more than 30 to 60% by weight solvent are used. In current practice of such methods, mixtures of solvents are used, but still in relatively large amounts to obtain satisfactory coatings.

Thus, in prior art employing solvents for reducing and atomizing paint, solvent use has been restricted to lower temperatures and relatively large amounts of volatile solvents. Also, heating paints containing solvent in an open vessel results in substantial loss of solvent before application can be effected. Systems for circulating such solvent paints have included exposed reservoirs resulting in excessive losses of volatile solvent or have restricted temperatures to values too low to secure substantial atomizing and reducing benefits; or have resorted to use of large and excessive proportions of the solvent at low or intermediate temperatures. In another approach of the prior art, high boiling or "slow" solvents, such as butyl Cellosolve have been used. These materials boil at temperatures under atmospheric pressure which are above the temperatures required for atomization of the paint-solvent mixture; therefore, little solvent is lost. However, larger amounts of these high boiling solvents, e.g., 15–25% or more, are required to secure practical results. These materials are thus vastly more costly per pound than the volatile solvents and cause very undesirable after-effects in paint films during application and curing, such as sagging of the film. More energy is also required to remove them from paint films in oven curing.

In U.S. Pat. No. 4,247,581 of Walter H. Cobbs, Jr. et al, a method is disclosed for the application of high quality coatings without air pollution. According to the method, the film-forming solids are first foamed to a relatively stable, energized state and thereafter subjected to an external atomizing force. The atomized particles are then conveyed to form a film on a substrate. In particular, polymeric liquids or melts, otherwise somewhat elastic and resistant to deformation, can be atomized and sprayed after being placed in a foamed state. Moreover, the method can be accomplished without resort to any polluting solvents or where such solvents are present in only minimal amounts.

In view of the above background, further improvements in coating high solids film-forming compositions are being sought.

SUMMARY OF THE INVENTION

This invention relates to a method of coating high solids film-forming compositions by a technique which requires only a minor amount of a volatile solvent to achieve atomization and application of a paint or other coating material. High solids coating compositions containing as much as about 70 to 99 percent by weight solids are able to be atomized and coated utilizing the principles of this invention. In accordance with this method, polymeric compositions having high molecular weight can be employed as coating materials. Further, health and safety hazards heretofore caused by relatively large amounts of solvent materials are avoided. These benefits and other advantages of this invention will be understood with reference to the description which follows.

The method of coating high solids film-forming compositions of this invention includes the steps of providing a high solids liquid coating composition comprising film-forming solids and a minor amount of a liquid atomizing agent. The composition contains about 70 to about 90 percent by weight film-forming solids and the liquid atomizing agent is present in an amount of about 1 to about 30 percent by weight. The thus formed coating composition is maintained under heat and pressure such that the temperature is above the normal boiling point of the liquid atomizing agent. Such high solids coating compositions are atomized by releasing the pressure upon a stream of the composition at a temperature above the normal boiling point of the solvent and below the minimum foam temperature at atmospheric pressure for the composition. The film-forming solids are then conveyed with or without an external atomizing means toward a surface to form a film of solids on the surface. According to the atomization technique, liquid compositions containing film-forming solids may thus be atomized and coated onto a surface with as little as from about 1 to about 30 percent by weight of solvent or even as low as about 1 to about 10 percent by weight of such solvent.

As developed in the background of this invention, prior art techniques employ solvents in relatively large amounts and for coating at lower temperatures from about room temperature to generally below the normal boiling point temperature of the solvent. Such solvent usage has led to excessive losses and excessive pollution. Furthermore, the direction of the prior art for spraying high temperature paints has been to eliminate low boiling solvents from the formulas. This invention, in contrast, is directed to a method of atomization employing minor amounts of volatile solvents by maintaining the composition containing such solvent under a pressure and at a temperature above its normal boiling point and below a minimum foam point for such composition upon release of pressure to atmosphere. This invention makes use of a novel discovery that highly volatile solvents have an extraordinary power to reduce or lower viscosity and facilitate the atomization of high solids resins compositions at elevated temperatures. The method is conducted by providing a film-forming composition comprising a film-forming solid in a minor amount of the volatile agent. When such a composition is maintained under pressure at a temperature above the normal boiling point of the solvent, but below a temperature where foaming of the composition takes place on release to a lower or atmospheric pressure, atomization is facilitated. Following the method, it is possible and very useful to use amounts of volatile solvent below about 30 percent by weight and even preferably below 10 percent by weight to secure the desired atomization. In contrast to the foam coating of U.S. Pat. No. 4,247,581, an elevated temperature is employed which is below that causing a foam to form on release of pressure. Thus, the temperature range according to the principles of this invention extends from the normal boiling point of the volatile solvent to the foaming temperature of the mixture of solvent and film-forming composition.

Thus, this invention is predicated in part upon the surprising atomization results achieved by small amounts of a volatile solvent in high solids resin compositions which has been found effective in atomization above the boiling point of the solvent and below the minimum foaming temperature at atmospheric pressure for the composition. It is surmised that there is an unexpectedly large lowering of the vapor pressure of such minor amounts of solvents by the resins with which they are mixed. Solvents having 5 or less carbon atoms in their molecular structure such as methanol, or other lower alcohols, acetone, etc., have been found very effective for atomizing high solids resin compositions above the normal boiling point of the solvent but below the foam points of the solvent-resin compositions.

In another aspect of the invention, solvent-paint systems may be processed through a dispensing apparatus and furnished to either an airless or air atomizing gun. In such methods film-forming solids and solvents of a rather volatile nature are used to aid in atomization. Such solvent-paint mixtures are maintained in the supply container at a lower temperature and pressure, i.e., atmospheric pressure. From such a supply container, a portion is transferred to a circulating loop means wherein the solvent-paint mixture is processed under a higher pressure and temperature. Coincidental heating and mixing occurs in the loop and, thus, uniformity of composition is maintained. By such controlled heating and mixing, uniform compositions are capable of being sprayed upon release of pressure whereby the volatile component is above its boiling point at atmospheric pressure at the gun or dispensing orifice and aids in the application of paint. The methods, therefore, perform a very useful function of enabling solvent-paint mixtures to be maintained without deterioration, transferred to a suitable spray-heat and sprayed with uniform results.

In another feature of this invention, the transfer from the container to the circulating loop is accomplished by a pump which provides a desired flow rate to the circulating loop. In the circulating loop, a second pump is provided for circulating portions of the composition from the supply container or reservoir at a higher temperature and pressure. The circulating loop is isolated from the supply source by a suitable means such as a valve. The pump in the recirculating loop also enables the composition to be recirculated several times the flow rate used through the spray gun or dispensing head to maintain uniformity of composition in foam coating or solvent-paint coating.

The coincidental heating and mixing of the compositions may be either accomplished by a dynamic or static device. In the case of a dynamic mixer, a mechanically moving stirrer may provide the mixing element. In the case of the static mixer, it has been found preferred to employ a conduit heating and mixing means containing a number of relatively short elements of right and left-hand helices in the conduit with the walls of the conduit in heat transfer relationship with the liquid. These types of static mixers are disclosed in U.S. Pat. No. 3,800,985, for instance. The heater-mixer in the circulating loop provides, as pointed out above, a system to ensure adequate heating and mixing of components of the composition. For instance, where a composition containing a film-forming liquid and a liquid atomizing agent is provided to the closed loop system, recirculation through the heater-mixer enables adequate mixing of the components at the processing temperature for a sufficient period of time prior to dispensing. By closing off the circulating loop from the supply source maintained at a lower temperature, the supply containing a large amount of liquid need not be brought to temperature desired for adequate atomization of a portion thereof. Furthermore, employing the circulating loop of this invention, direct supply sources, heated hoses, heated guns and objectionable electrical connections, usually necessary in such spraying or coating operations, are avoided. In addition, where solvent-paint mixtures are employed for coating, the closed loop under heat and pressure enables maintenance of volatile solvent in the paint mixture as an aid in atomization. The apparatus is especially useful where the temperature in the loop is necessarily maintained above the normal boiling point of the solvent in accord with other unique aspects of this invention. In these circumstances, only a portion of the solvent-paint mixture needs to be transferred to the circulating loop for maintenance under heat and pressure with coincidental heating and mixing. Thus, employing this invention, significant improvements are obtained enabling liquids and rather heat sensitive compositions, such as solvent-paint compositions, to be handled, dispensed to a spray gun for application to a surface with constant compositional uniformity.

DETAILED DESCRIPTION

Figure 1:
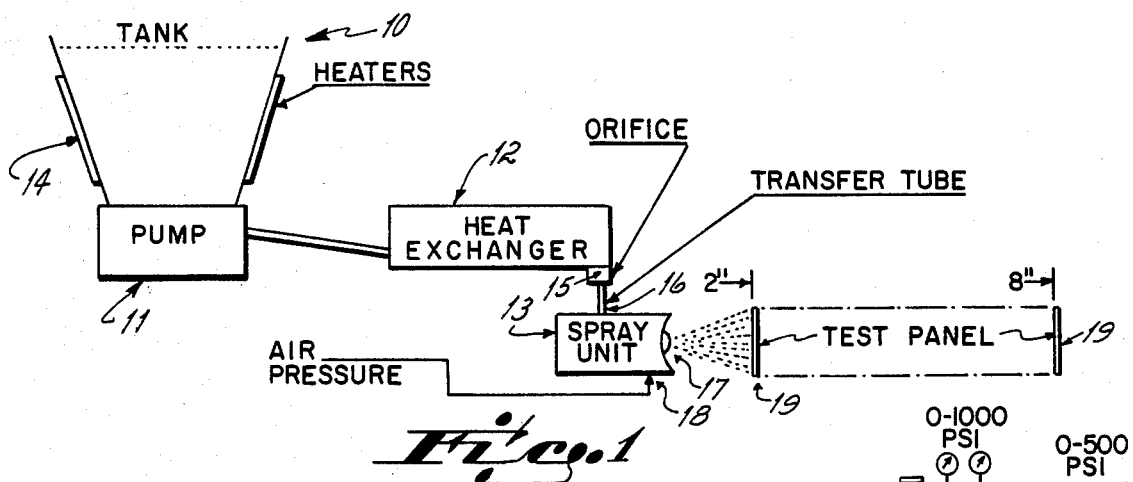

Compositions which may be dispensed according to this invention include coating and adhesive compositions which comprise film-forming or polymeric components. The polymeric component may range from a liquid, to a semi-solid paste, to solid under normal conditions. Under the action of heat, liquidity may be achieved. The liquid state of film-forming solids containing solvent is enhanced by the application of heat and pressure. The liquids may contain either thermoplastic or thermosetting resinous compositions. Polymeric film-forming compositions can be obtained in liquid form without the addition of solvents or other liquid diluents. Common resins of the industrial coatings industry without solvents are therefore suitable including syrups of methacrylates, acrylates and copolymers thereof, alkyd resins, polyester resins, polyurethanes, epoxies, coating grade polyethylenes, ethylene vinylacetate copolymers, polyvinylchlorides, various rubber compositions and the like. The coating and finishing resins presently primarily in use are alkyd polyester resins or polyesters. In this regard, the term "alkyd" polyester resin is intended to include those resins which are modified polyester resins, usually oil modified resins. "Polyester resins" are the synthetic resins derived from polyfunctional alcohols or acids. The next most important resin for present industrial coating is made up of mainly acrylic polymers and copolymers, with the balance of the market comprising vinyls, epoxies, polyurethanes, aminos, cellulosics and other similar resins. Therefore, it is to be understood that a film-forming component of the liquid compositions of this invention includes a wide variety of polymeric components of the type just mentioned and well understood by those skilled in the arts of the paint and coatings industry. The principal polymeric composition which may be employed in any of the methods defined above depends upon the end use of the composition, whether for coatings, adhesives, and so forth, as will be understood to a person of ordinary skill in the art. Sources existing in the surface coatings literature to illustrate the specific types of coatings for particular domestic or industrial applications include the handbook of "Surface Coatings" prepared by the Oil and Color Chemists' Association, Australia, in conjunction with the Australian Paint Manufacturers' Federation, the New South Wales University Press, 1974; Treatise on Coatings, Col. 4 (in two parts entitled "Formulations", Part I, edited by R. R. Myers and J. S. Long, Marcel Dekker, Inc., 1975); and "Paint Finishing in Industry" by A. B. Harvey, Second Edition, Robert Draper, Great Britain (1967). These sources are included herein by reference for more detailed disclosures of compositions and coating techniques which may be used according to the principles of this invention. Other coating compositions which may be atomized according to this invention are thermoplastic materials. A "thermoplastic material", as that term is used and understood to those skilled in the art, includes any natural or synthetic thermoplastic polymer or polymeric compositions. A thermoplastic material is a normally solid or semi-solid material at use temperatures and it melts or liquifies upon heating to a higher temperature. Upon cooling the material solidifies or returns to a solid or semi-solid state. Examples of thermoplastic materials include polymers of ethylenically unsaturated monomers, such as polyethylene, polypropylene, polybutylenes, polystyrenes, poly ($\alpha$-methyl styrene), polyvinyl chloride, polyvinyl acetate, polymethyl methacrylate, polyethyl acrylate, polyacrylonitrile and the like; copolymers of ethylenically unsaturated monomers such as copolymers of ethylene and propylene, ethylene and styrene, and polyvinyl acetate; styrene and maleic anhydride; styrene and methyl methacrylate; styrene and ethyl acrylate; styrene and acrylonitrile; methyl methacrylate and ethyl acrylate and the like; polymers and copolymers of conjugated dienes such as polybutadiene, polyisoprene, polychloroprene, styrenebutadiene rubber, ethylene-propylene-diene rubber, acrylonitrile-styrene butatiene rubber and the like; saturated and unsaturated polyesters including alkyds and other polyesters; nylons and other polyamides; polyesteramides and polyurethanes; chlorinated polyethers, epoxy polymers, cellulose esters such as cellulose acetate butyrate, and the like.

In practicing the processes of this invention, therefore, with certain of the above thermoplastic or thermosetting film-forming solids compositions, a minor amount, i.e., about 1–30 percent by weight, preferably about 1–10 percent by weight, of the liquid atomizing agent or solvent is employed. Suitable agents or solvents include methanol, ethanol, isopropanol, acetone, methyl ethyl ketone, chloroform, methylal, propyl alcohol, tetrahydrofuran, methylene chloride, n-butyl chloride, sec-butyl chloride, propyl formate, methyl isopropyl ketone, methyl chclyhexane, diethyl carbonate, methyl formate, t-butyl chloride, isopropyl formate, propyl chloride, n-butanol, isobutanol, diethyl acetal, t-butyl acetate, n-butyl formate, methyl butyrate, isobutyl formate, propionitrile, sec-butanol, ethyl propionate, dimethylfuran, methyl pirolate, trimethylene oxide, methyl propionate and ethyl formate.

Figure 2:
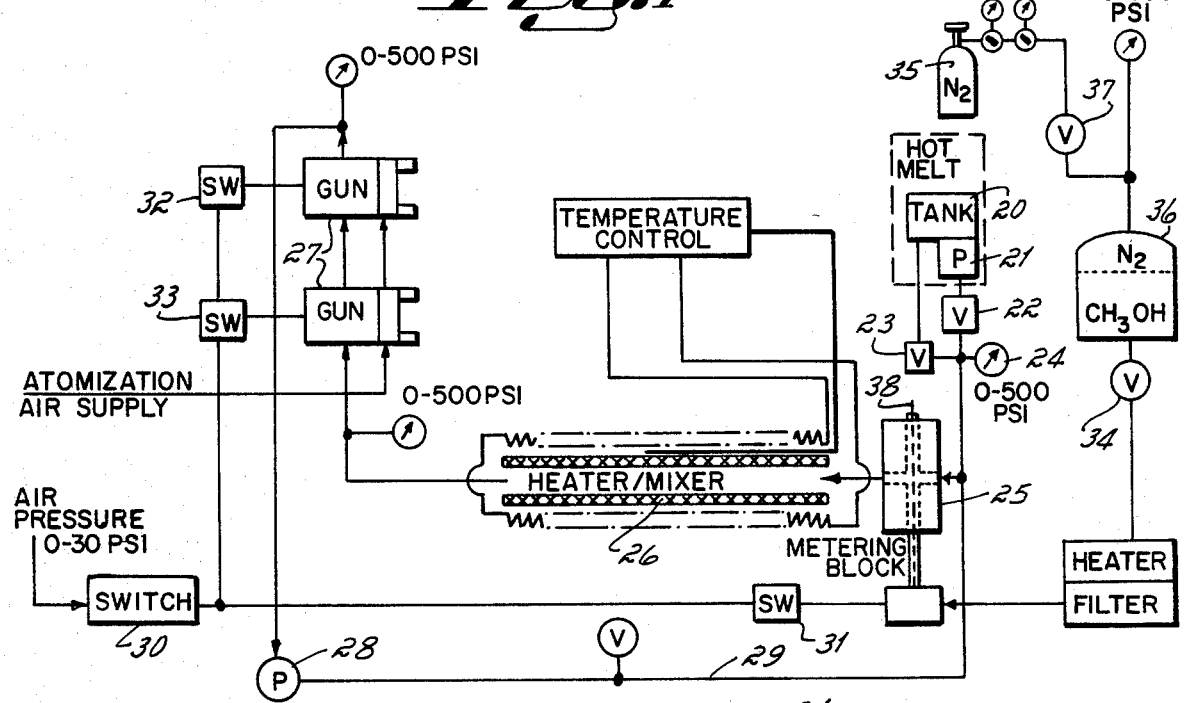
Figure 3:
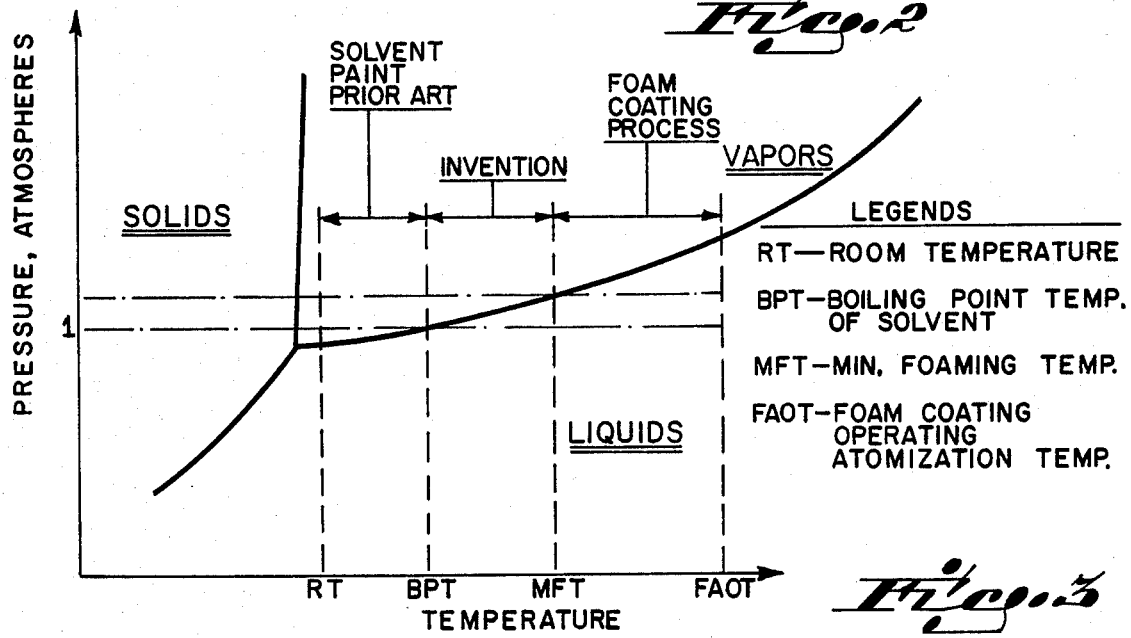

The principles of this invention will be further understood with reference to the following detailed examples and the drawing in which:

FIG. 1 is a schematic of a suitable apparatus for performing the coating method of this invention;

FIG. 2 is a schematic of another apparatus for performing the coating method of this invention; and FIG. 3 is a phase diagram summarizing the method of this invention in comparison to the prior art and U.S. Pat. No. 4,247,581 by Cobbs et al.

Referring to FIG. 1 of the drawing, an apparatus for performing the method is shown. The apparatus employs a tank 10 or funnel grid for containing the paint composition having associated therewith a pump 11. The pump 11 illustrated is a typical air motor gear drive pump, however, any pump capable of providing sufficient pressure, up to 100 pounds, to pump the paint sample through the heat exchanger 12 on to the spray unit 13 is suitable. The apparatus of FIG. 1 was operated for spraying a polyester resin paint composition of Example 1.

EXAMPLE 1

| (1) | Polyester Resin | 415.5 grams |
|---|---|---|
| (2) | TiO2 | 475.0 grams |
| (3) | Hexamethoxymethyl melamine | 178.1 grams |
| (4) | Silicone surfactant | 1.8 grams |
| (5) | Catalyst | 3.0 grams |
| (6) | Methanol (5% of resin solids) | 20.8 grams |
| | | 1094.2 grams |

The polyester resin employed above was 100% solids consisting essentially of adipic and phthalic acids polymerized with propylene glycol and trimethylolpropane. The viscosity of the polyester resin formula without methanol and catalyst was determined over the range of about 125° F. to about 225° F. to be about 45,000 to 4,000 centipoises.

The paint composition was introduced into the tank at about 77° F. The tank heaters 14 were operated to raise the temperature to allow the high viscosity paint composition to flow into the intake of the pump 11, i.e., about 130° F. From the pump, the paint composition passed under pressure of about 100 p.s.i.g. through the in-line heat exchanger 12 to raise its temperature to about 185° F., then through a 0.012 to 0.025 inch orifice 15. This temperature was above the boiling point of methanol (the low boiler), but below the minimum foam temperature of the composition, i.e., about 200° F. One method for determining the minimum foam temperature of about 200° F. was to observe the lowest temperature at which foaming could be detected by visual observation of bubbles in the liquid stream issuing from the fluid nozzle 17. The paint thus flows through tube 16 to the entrance port of a spray unit 13, for instance a Model 61 Binks air spray unit. From the nozzle 17 of unit 13 (0.052 inch diameter) the paint composition issued at a temperature about 185° F. at a rate of about 5 oz. per minute. A pressure of 40–50 p.s.i.g. was applied to the air intake 18 of unit 13, whereupon the paint composition was atomized and conveyed to a test panel 19 of steel plate.

Cuts through the spray at a distance of 8 inches from the nozzle were made on black paper and showed a uniform distribution of fine paint composition particles. After baking the test panel 19 in an oven at 350° F. for 25 minutes, the thickness of the coating was found to be 0.8–1.0 mils using a magnetic gauge.

In comparison to the above example, Example 1 of application U.S. Pat. No. 4,247,581 involved foaming at a temperature above the minimum foaming temperature for the paint-solvent mixture and making black paper cuts at said temperature of atomization by air spray. However, it was found when the temperature was lowered to a temperature below the minimum foaming temperature (hence the foam volume ratio was near one), and black paper cuts of atomization were again made at the lower temperature in the absence of foaming, useful atomization was achieved. Although such lower temperature cuts were always lower in quality of atomization than those from foaming paint atomizations, many of them represented useful atomization quality levels, even for samples of paint at only 4–5% volatiles by weight.

These results were indeed surprising because small amounts of volatile solvents in high solids resin were effective in atomization above the boiling point of methanol and below the minimum foam temperature at atmospheric pressure for the composition. It is surmised that there is an unexpectedly large lowering of vapor pressure of the solvent by the resins with which it is mixed. Solvents such as methanol or other lower alcohols, acetone, etc., have been found very effective for atomizing high solids above the normal boiling point of the solvent but below the foam points of the solvent-resin compositions.

Referring to FIG. 2, another apparatus is diagramatically illustrated for the purpose of practicing the invention. Paint formulations are placed in the hot tank unit 20 and usually brought to 120°–150° F. by that unit. Air pressure is supplied to the motor in this unit driving the gear pump 21 and valve 22 is opened. A valve 23 is adjusted to provide a minimum flow through pump 21 for stable pressure reading on output line gauge 24. Viscous high solids paint thus flows through lines (pipes) as indicated by the arrows to the metering block 25 and through this block into the heater-mixer unit 26. The mixer itself can be of the static type disclosed in U.S. Pat. Nos. 3,286,992; 3,664,638; 3,704,006 and 3,800,985. The mixer shown is preferably constructed of a number of short (½ inch) elements (21 in number) of right and left-handed helices as described in the last mentioned patent. The paint then flows through this unit into the lines to the guns 27, thence to the return line and into the pump 28. This pump returns the paint through the loop return line 29 to the metering block inlet. The temperature controller supplies heat as needed to the heater-mixer 26 raising the temperature of paint in the loop to the value selected. Temperatures from 160° F. to 230° F. may be used. When the loop has come up to operating temperature, including the guns and all lines, the pneumatic air switch 30 is operated on along with air valves 31 and either or both air valves 32. 33. Volatile solvent or low boilers, such as methanol, flows via valve 34 into the metering block under a pressure difference set with the regulator on the nitrogen tank 35 applied to the Greer bottle diaphragm 36 through lines and valve 37. Typically the pressure difference is set for 100 psi, with the pressure at the Greer bottle being 100 psi higher than the paint pressure at the inlet to the metering block 25. When methanol is metered into the paint, the fluid is allowed to flow out of the gun(s) which are turned on also by switch 30; circulation in the loop and flow out from the guns both take place simultaneously. Adjustments to pumps 21 and 28 are made to give the desired flow rate from the gun (2), typically 5 oz./min. by weight. Recirculation occurs in the loop from about 4–12 times the flow through the gun(s), i.e., typically 20–60 oz./min. by weight flow in the loop. The wire 38 in the metering block 25 may be adjusted to meter solvent at fixed rates from 2–10 grams/minute so as to give the desired percent solvent in the paint (2 to 5 percent). However, fine adjustment is made by varying the difference in pressure between the Greer bottle methanol reservoir 36 and the paint inlet pressure at metering block 25.

If desired, samples of paint from the gun may be taken in a 150 cc dixie cup and weighed to determine minimum foam temperature and ratios. By setting the pressure as above, stable metering and flow operation occur with constant flow of paint from the gun(s). When conditions have been established, air is supplied to the gun air caps and paint at the nozzle of the guns is atomized. Black paper cuts are made to prove atomization by comparison with industrial standards. Instead of supplying methanol from the Greer bottle, methanol can be introduced into the paint at or before placement in the tank unit. In the latter case, valve 31 of FIG. 2 is turned to off, otherwise procedure is same as above.

EXAMPLE 2

The apparatus of FIG. 2 was operated for spraying an epoxy paint formulation prepared using the materials listed below:

| Shell Epon 1001* | 2602.8 grams |
|---|---|
| Shell Epon 828* | 162.0 grams |
| Hexamethoxymethyl melamine | 122.4 grams |
| Methanol | 32.4 grams |

*low molecular weight condensation polymers of epichlorohydron and bisphenol-A

Following essentially the procedure described in connection with FIG. 2, the epoxy paint was placed in the loop apparatus, brought to operating temperature as hereinafter specified, under about 100 p.s.i.g. and sprayed using air atomization with a heated, thermostated gun. The flow rate was adjusted to approximately 5 oz./minute and cuts were made with black paper through the spray pattern a few inches from the nozzle. The minimum foaming temperature point was determined to be 180°–185° F.; that is the lowest temperature at which foaming could be detected by visual observation of bubbles in the liquid stream issuing from the fluid nozzle. The best atomization was obtained at 225° F. with a foam ratio by volume at 14 to 9/1, and very good panels were made. The temperature was then lowered to 175° F. At this temperature with no foaming, atomization was not as good as at 225° F. Test panels were also good when baked for 20 minutes at 350° F. This example thus illustrates the atomization of the film-forming resin solids by maintaining a minor amount of a volatile solvent under heat and pressure at a temperature above its normal boiling point, but below the minimum foam temperature of the composition. On release of pressure to atmosphere upon passing through a spray orifice, atomization occurs with external air atomization means.

EXAMPLE 3

An apparatus essentially like FIG. 2 was operated for spraying the following ingredients formulated on a percent by weight basis:

| 12.7% | VYLF Union Carbide, resin, i.e., copolymer of vinyl chloride and vinyl acetate in a ratio of 88:12 |
|---|---|
| 12.7% | Hexamethylmethoxy melamine |
| 47.2% | Dioxctyl Phthalate plasticizer |
| 0.3% | Thermolite 49 Stabilizer (M & T Chemicals) |
| 0.4% | Thermolite 31 Stabilizer (M & T Chemicals) |
| 25.4% | $TiO_2$ |
| 1.3% | Methanol |

The above vinyl resin, hexmethylmethoxy melamine and $TiO_2$ were mixed together in a container and agitated at high speed. While under agitation, the stabilizers above mentioned were added near the start of the grind to avoid degradation due to heat. After approximately 30 minutes, the mixture was reduced with the plasticizer and methanol. Whereupon the mixture was again agitated until a thorough blend was achieved. The viscosity by ASTM D3236 was 2090 cps (without methanol) at 200° F. This coating composition was processed with an apparatus like that of FIG. 2. After introduction into the tank unit at about 125° F., the paint was brought to operating temperature as hereinafter specified, at about 100 p.s.i.g., with continuous circulation. The minimum foam point was determined by visual observation of bubble formation in the liquid from the fluid nozzle, to lie between about 205° F. and 210° F. Black paper cuts were taken through the spray patterns from both air spray and airless spray heads at a temperature above the minimum foam point, e.g., 225° F., and a temperature below the foam point, e.g., 200° F. Atomization for both air spray and airless spray was noticeably better at 225° F., above the minimum foaming temperature. However, good panels were sprayed at a flow rate of 4.6 oz./min. at both 225° F. and 200° F. Airless results were obtained using a hydraulic pressure of 900–1000 p.s.i.g. and a Nordson Corporation airless 000910 nozzle w/09 TP.

EXAMPLE 4

An apparatus similar to that illustrated in FIG. 2 was also employed in this example. An acrylic enamel extended with polyester resin was formulated by combining the following components on a weight basis.

| Acrylic Resin (Dupont, "Elvacite" EP2028) | 261.9 |
|---|---|
| Acrylic-Polyester Resin Castolite-AF (The Castolite Company) | 1900.7 |
| Hexamethylmethoxy Melamine | 930.1 |
| Titanium Dioxide | 2479.2 |
| Silicone Surfactant | 8.6 |
| Methanol | 352.2 |

The viscosity of this formulation was determined to be 1100 cps at 200° F. by ASTM D3236. The formulation was placed in the loop apparatus like FIG. 2 and brought to operating temperature as hereinafter specified, under about 200 p.s.i.g., with circulation. The minimum foaming temperature was determined by observing bubbles visually in the liquid from the fluid nozzle and was found to be between 175° F. and 180° F. The material was air sprayed at about 215° F. and cuts with black paper were made to show the results. After cooling down below the minimum foaming temperature, cuts were again made by air spraying at about 173° F. These cuts showed break-up to be better above the minimum foaming temperature than below it. However, acceptable panels were made by both techniques and air dried.

EXAMPLE 5

Three formulations were prepared for evaluations in an apparatus substantially the same as that described in FIG. 2. These are designated nominally 5% acetone; 5% acetone - 5% ethyl "Cellosolve" acetate, and 10% acetone because of the volatile solvent component in each. The complete formulations are given below.

| I. 5% Acetone | | |
|---|---|---|
| (1) | Polyester Resin | 2077.5 grams |
| (2) | TiO₂ | 2375.0 grams |
| (3) | Hexamethoxymethyl melamine | 890.5 grams |
| (4) | Silicone surfactant | 9.0 grams |
| (5) | Catalyst | 23.7 grams |
| (6) | Acetone | 268.8 grams |

| II. 5% Acetone - 5% Ethyl Cellosolve Acetate | | |
|---|---|---|
| (1) | Polyester Resin | 2077.5 grams |
| (2) | TiO₂ | 2375.0 grams |
| (3) | Hexamethoxymethyl melamine | 890.5 grams |
| (4) | Silicone surfactant | 9.0 grams |
| (5) | Catalyst | 23.7 grams |
| (6) | Acetone | 268.8 grams |
| (7) | Ethyl cellosolve acetate | 268.8 grams |

| III. 10% Acetone | | |
|---|---|---|
| (1) | Polyester Resin | 2077.5 grams |
| (2) | TiO₂ | 2375.0 grams |
| (3) | Hexamethoxymethyl melamine | 890.5 grams |
| (4) | Silicone surfactant | 9.0 grams |
| (5) | Catalyst | 23.7 grams |
| (6) | Acetone | 537.6 grams |

The polyester resin used in these formulations is made from a mixture of dibasic acids and a mixture of dihydric and trihydric polyols. The dibasic acids are combinations of ortho or isophthalic acid and adipic acid or azelaic acid. The trihydric alcohols can be glycerine, trimethylol ethane or trimethylol propane, and the dihydric alcohols can be ethylene, propylene, neopentyl or trimethylpentanediol. There can be minor amounts of monobasic acids of the saturated types such as coconut fatty acid, pelargonic acid, benzoic acid or paratertiary butyl benzoic acid used. Ethyl "Cellosolve" acetate is a trade name for ethylene glycol monoethyl ether acetate.

Each formulation material was placed in the tank unit of FIG. 1 and brought to the entry temperature of about 150° F.; from there it was pumped into the circulation loop where it was circulated by means of the gear pump, the whole loop circuit being maintained at the supply pressure from the tank at about 100 p.s.i.g. In this procedure the heater-mixer comprised two mixers of the type described above in connection with FIG. 2 in the loop which were immersed in a thermostated oil bath with separate oil circulation and control. A spray gun for air spray of the material in the loop is fed by hot melt hoses, both being within the loop flow system. The hoses were electrically heated and thermostatically controlled at the loop temperature; the gun was also similarly controlled at the same temperature as specified hereinafter. Samples were sprayed at chosen temperature and black paper cuts were made for each sample, essentially following procedures for air spraying as in FIG. 1. Results are summarized in the Table below.

TABLE I

| Formulation Used | 0–10 Quality/Temperature °F. |
|---|---|
| I. 5% Acetone Foam Temp. = 210° F. | 2/190° F. 4/205° F. 6/218° F. 8/222° F. |
| II. 5% Acetone.5% Ethyl Cellosolve Acetate Foam Temp. = 185° F. | 3/156° F. 5/175° F. 7/196° F. 9/220° F. |
| III. 10% Acetone Foam Temp. = 170° F. | 4/163° F. 6/173° F. 8/181° F. |

On the scale of 0–10, a value of 2 means the atomization was usable and, as the values increase from 2 to 10, the results become better to superior at a value of 10. Thus, these results show that the foam temperature varies for the particular solvent employed and its amount. However, below the foam temperature usable and good atomizations were achieved. Generally the quality of the atomization was better above foam point. However, these examples demonstrate that below the foam point but above the boiling point of the low boiling solvent, atomization can be achieved with minimal amounts of solvent. Thus, resin solids can be sprayed from about at least about 70–80% by weight and even up to 92–93% or more, utilizing the principles of this invention. It is to be understood that flow out onto the panels will be improved by the inclusion of a higher boiling solvent. In this case, 5% ethyl Cellosolve acetate has a boiling point of about 156° C., or well above the boiling point of acetone or the foam point of 185° F. However, the presence of the high boiling solvent lowered the foam temperature of 5% acetone from 210° F. to 185° F. and its presence also enhances the flow out onto sprayed panels.

EXAMPLE 6

An apparatus substantially the same as that described in FIG. 2 was employed for spray coating of the following epoxy-melamine high solids can coating.

| Shell Eponex DRH 151-1 Resin* (Pretreated with H₃PO₄ in 65.2 grams isopropanol) | 1856.6 grams |
|---|---|
| Hexamethoxymethyl melamine | 1508.1 grams |
| Monsanto Modaflow (acrylophosphoester processing aid) | 7.3 grams |
| Catalyst 3525 (25% dinonyl | 30.0 grams |

| | -continued | |
|---|---|---|
| | naphthalene disulfonic acid in alcohol) | |
| | Ethyl Cellosolve Acetate | 150.0 grams |
| | Acetone | 150.0 grams |

*This resin is an isopropyldenedicyclohexanol-epichlorohydrin resin.

The above resins were placed in a one gallon pail and mixed with a mechanical stirrer for about 20 minutes. Then, the other ingredients of the formulation above were added with continued mixing for about 15 minutes. The viscosity of the total mixture was measured and the solids content determined by weight loss at about 225° F. for two hours. Volume solids were found to be about 75.8%. Then, the foam temperature was determined on a portion of the formulation and found to be about 220°-225° F. Upon employing the loop apparatus substantially the same as that described in FIG. 2, with an airless spray gun and nozzle similar to that identified in the previous examples, at an operating temperature of about 210°-215° F. under a pressure of about 800 p.s.i.g., test panels of aluminum and tin plated steel were sprayed. On the tin plated steel, coating weights varied from about 18.2 to about 56.9 grams on 8 square inches of panel. The coating qualities were very good with excellent flow out. The above tests were repeated with a number of different nozzles and restrictors with an operating temperature set below the minimum foam temperature, namely at about 210°-215° F. Very acceptable coating weights and distribution on beverage can surfaces were obtained.

The above example contained a mixed solvent system of acetone, isobutanol and isopropanol. The mixture normally boils at 98°-102° C. However, as stated above, the gun was set for operation above the boiling point under a pressure of approximately 800 p.s.i.g., but below the minimum foam temperature of the composition. Under these conditions, airless atomization of the coating formulation at approximately 75% volume solids was achieved with good efficiency.

EXAMPLES 7-32

In addition to the above Examples, a method of screening was employed to determine a list of organic solvents which may be suitable for use according to the principles of this invention. For this purpose, a standard polyester paint having the ingredients specified in Example 1 was employed and a solvent listed in Table II was substituted for methanol on a 5% by weight basis. The standard paint with the added solvent was then heated to a maximum of 225° F. and the temperature at which foaming occurred in a beaker at atmospheric pressure was observed.

TABLE II

| EXAMPLE NO. | SOLVENT | BOILING POINT | FOAMING °C. | TEMP. °F. |
|---|---|---|---|---|
| 7 | Methanol | 64.7° C. | 103 | 217.4 |
| 8 | Ethanol | 78.4° C. | 95 | 203.0 |
| 9 | Isopropanol | 82.4° C. | 97 | 206.6 |
| 10 | Acetone | 56.0° C. | 100 | 212.0 |
| 11 | Methyl Ethyl Ketone | 79.6° C. | 96 | 204.8 |
| 12 | Chloroform | 61.0° C. | 90 | 194.0 |
| 13 | Methylal | 42.3° C. | 85 | 185.0 |
| 14 | Propyl Alcohol | 97.0° C. | 100 | 212.0 |
| 15 | Tetrahydrofuran | 65.0° C. | 94 | 201.2 |
| 16 | Methylene Chloride | 40.0° C. | 85 | 185.0 |
| 17 | n-Butyl Chloride | 78.5° C. | 89 | 192.2 |

TABLE II-continued

| EXAMPLE NO. | SOLVENT | BOILING POINT | FOAMING °C. | TEMP. °F. |
|---|---|---|---|---|
| 18 | sec-Butyl Chloride | 68.3° C. | 84 | 183.2 |
| 19 | Propyl Formate | 81.0° C. | 97 | 206.6 |
| 20 | Methyl Isopropyl Ketone | 95.0° C. | 102 | 215.6 |
| 21 | Methyl Formate | 32.0° C. | 90 | 194.0 |
| 22 | t-Butyl Chloride | 50.7° C. | 89 | 192.2 |
| 23 | Isopropyl Formate | 70.0° C. | 102 | 215.6 |
| 24 | Propyl Chloride | 47.0° C. | 87 | 188.6 |
| 25 | t-Butyl Acetate | 96.0° C. | 99 | 210.2 |
| 26 | Methyl Butyrate | 103.0° C. | 105 | 221.0 |
| 27 | Isobutyl Formate | 98.0° C. | 103 | 217.4 |
| 28 | Propionitrile | 97.0° C. | 100 | 212.0 |
| 29 | Ethyl Propionate | 99.0° C. | 107 | 224.6 |
| 30 | Dimethylfuran | 93.0° C. | 102 | 215.6 |
| 31 | Trimethylene Oxide | 50.0° C. | 94 | 201.2 |
| 32 | Ethyl Formate | 54.0° C. | 89 | 192.2 |

Employing the above volatile components from Table II, it will be understood that a number of volatile solvents may be employed according to the principles of this invention for performance in the apparatus of FIG. 2 with a number of film-forming polymeric compositions. Wherefore, it will be understood to those of ordinary skill in the art that a particular volatile solvent or mixture of solvents may be employed with any one of a number of film-forming coating compositions, e.g., epoxy, polyester, or other resin base type.

The above examples give rise to the generalized situation represented by the phase diagram of FIG. 3. With reference to FIG. 3, a phase diagram between solids, liquids and vapors is generally described by the solid lines with the physical state dependent upon the pressure and temperature. The prior art is represented by the area between room temperature and the boiling point of a solvent for reducing and atomizing paint. As pointed out in the background of this invention, the use of such solvents has been restricted to relatively large amounts and lower temperatures from about room temperature to below the boiling point temperature. As pointed out in the background, such solvent usage has lead to excessive losses and excessive pollution. Furthermore, as developed in U.S. Pat. No. 4,247,581, the atomization of film-forming solids occurs above about a minimum foam temperature, frequently at a slightly higher temperature where continuous foam coating atomization results. The area in between the solvent paint prior art and the foam coating process as represented by FIG. 3 is the area where this invention resides. The inventive method, as illustrated by the phase diagram, makes use of a novel discovery that highly volatile solvents have an extraordinary power to reduce or lower viscosity and facilitate the atomization of paint at elevated temperatures. As developed above, following the method, it is possible and very useful to use amounts of volatile solvent below 30% by weight and even more preferably below 10% by weight to secure the desired atomization of high solids coatings.

In view of the above detailed description, other embodiments of the invention will become apparent. Such variations to achieve the advantageous results of this invention will be understood to those of ordinary skill in the art in view of the above description.

We claim:
1. A method of coating comprising providing a coating composition comprising film-forming solids and a minor amount of a liquid atomizing agent, said composition containing about 70% to 99% by weight of said solids and about 1% to 30% by weight of said liquid atomizing agent, maintaining said composition under a pressure at a temperature above the normal boiling point of said liquid atomizing agent, atomizing said composition by reducing said pressure at a temperature above the normal boiling point of said liquid atomizing agent and below the minimum foaming temperature of said composition at atmospheric pressure, and conveying the atomized composition to form a coating film of said solids on a surface.

2. The method of claim 1 wherein said liquid atomizing agent is in an amount of about 1 to about 10% by weight.

3. The method of claim 1 wherein said solids are in an amount of 90 to about 99% by weight.

4. The method of claim 1 wherein said composition is atomized by an external atomizing force.

5. The method of claim 4 wherein the atomizing force is an external air flow.

6. The method of claim 1 wherein said composition contains polymer film-forming solids.

7. The method of claim 6 wherein said polymer comprises a thermosetting resin composition.

8. The method of claim 7 wherein said thermosetting resin is a polyester resin.

9. The method of claim 8 wherein said polyester resin contains a liquid atomizing agent selected from the group consisting of methanol, acetone, isobutanol, isopropanol, methyl ethyl ketone, and mixtures thereof.

10. The method of claim 1 wherein said film-forming solids comprises a polymer selected from the group consisting of a polyester, an epoxy polymer, a copolymer of vinyl chloride and vinyl acetate, an acrylic resin, and mixtures thereof.

11. A method of coating comprising providing a coating composition comprising film-forming solids and a minor amount of a liquid atomizing agent, said composition containing about 70% to 99% by weight of said solids and about 1% to 30% by weight of said liquid atomizing agent, coincidentally heating and mixing said composition in a loop maintained under a pressure for circulating said composition at a temperature above the normal boiling point of said liquid atomizing agent, said composition being maintained under pressure in its liquid state in said loop, selectively dispensing said composition from the circulating loop, atomizing said dispensed composition by reducing said pressure at a temperature above the normal boiling point of said liquid atomizing agent and below the minimum foaming temperature of said composition at atmospheric pressure, and conveying the atomized composition to form a coating film of said solids on a surface.

12. The method of claim 11 wherein the coincidental heating and mixing is conducted by static mixer.

13. The method of claim 12 wherein the static mixer comprises a conduit containing a number of fixed right and left-hand helices and conduit walls in heat transfer relationship with the composition.

14. The method of claim 11 in which the atomization is conducted by an air-spray gun.

15. The method of claim 11 wherein the atomization is conducted by an airless spray gun.

16. The method of claim 11 wherein said composition comprises a hydroxylated resin and an amine curing agent.

17. The method of claim 16 wherein said liquid atomizing agent is methanol.

18. The method of claim 11 wherein said composition comprises a thermosetting resin composition.

19. The method of claim 18 wherein said thermosetting resin is a polyester resin.

20. The method of claim 18 wherein said liquid atomizing agent is a by-product of a thermosetting reaction of said resin.

21. The method of claim 20 wherein said agent is methanol and said resin is a polyester resin.

22. The method of claim 11 wherein said liquid atomizing agent is in an amount of about 1 to about 10% by weight and said solids are in an amount of 90 to about 99% by weight.

23. The method of claim 11 wherein said film-forming solids comprises a polymer selected from the group consisting of polyester, an epoxy polymer, a copolymer of vinyl chloride and vinyl acetate, an acrylic resin, and mixtures thereof.

* * * * *